(12) United States Patent
Wetzel et al.

(10) Patent No.: US 11,287,037 B2
(45) Date of Patent: Mar. 29, 2022

(54) DEVICE FOR BLOCKING A TRANSMISSION

(71) Applicant: Robert Bosch GmbH, Stuttgart (DE)

(72) Inventors: Gerhard Wetzel, Korntal-Muenchingen (DE); Ingo Drewe, Fehmarn (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/627,441

(22) PCT Filed: May 15, 2018

(86) PCT No.: PCT/EP2018/062509
§ 371 (c)(1),
(2) Date: Dec. 30, 2019

(87) PCT Pub. No.: WO2019/001831
PCT Pub. Date: Jan. 3, 2019

(65) Prior Publication Data
US 2021/0148463 A1 May 20, 2021

(30) Foreign Application Priority Data

Jun. 30, 2017 (DE) ..................... 10 2017 211 218.2

(51) Int. Cl.
*F16H 63/34* (2006.01)
*F16H 57/02* (2012.01)
*F16H 61/00* (2006.01)
*F16H 57/04* (2010.01)

(52) U.S. Cl.
CPC ......... *F16H 63/3466* (2013.01); *F16H 57/02* (2013.01); *F16H 61/0006* (2013.01); *F16H 63/3491* (2013.01); *F16H 57/0457* (2013.01); *F16H 2057/02034* (2013.01); *F16H 2057/02043* (2013.01)

(58) Field of Classification Search
CPC .. F16H 63/3466; F16H 63/3491; F16H 57/02; F16H 57/0457; F16H 2057/02034; F16H 2057/02043; F16H 61/0006
See application file for complete search history.

(56) References Cited

U.S. PATENT DOCUMENTS

2018/0238448 A1* 8/2018 Gausrab .............. F16H 63/3491

FOREIGN PATENT DOCUMENTS

| CN | 101010529 A | 8/2007 |
| CN | 101925764 A | 12/2010 |
| CN | 102883926 A | 1/2013 |
| CN | 104976344 A | 10/2015 |

(Continued)

OTHER PUBLICATIONS

Feuersenger, Espacenet translation of DE102011086547, 2012, Espacenet (Year: 2012).*

(Continued)

*Primary Examiner* — Ernesto A Suarez
*Assistant Examiner* — Lori Wu
(74) *Attorney, Agent, or Firm* — Michael Best & Friedrich LLP (57) ABSTRACT

The present invention relates to a device for blocking a transmission comprising an actuation mechanism, which is arranged inside the transmission in an at least partially oil-filled transmission chamber, and a drive of the actuation mechanism, wherein the drive is arranged outside of the at least partially oil-filled transmission chamber.

17 Claims, 12 Drawing Sheets

(56) References Cited

FOREIGN PATENT DOCUMENTS

| | | |
|---|---|---|
| DE | 102009030006 A1 | 12/2010 |
| DE | 102010029401 | 12/2011 |
| DE | 102011086547 | 6/2012 |
| DE | 102014211390 | 12/2015 |
| DE | 102014219039 | 3/2016 |
| JP | 2000085552 A | 3/2000 |
| JP | 2013127264 A | 6/2013 |
| WO | 2017005407 | 1/2017 |

OTHER PUBLICATIONS

International Search Report for Application No. PCT/EP2018/062509 dated Jul. 11, 2018 (English Translation, 3 pages).

\* cited by examiner

DEVICE FOR BLOCKING A TRANSMISSION

BACKGROUND OF THE INVENTION

The present invention relates to a device for blocking a transmission, for example for a vehicle transmission or a transmission for a door drive, having an actuating device for engaging and disengaging a blocking means of a transmission, which blocking means is connected to the output, and having an emergency running actuating device for engaging the blocking means of a transmission in emergency running operation.

In automatic transmissions for motor vehicles, devices for blocking a transmission are used as parking locks, in order to prevent parked vehicles from rolling away unintentionally. To this end, as a rule, locking gears with tooth gaps are installed fixedly into the drive train so as to rotate with it, which locking gears block or release the rotational movement of the drive by means of actuable locking pawls which engage into the tooth gaps in a positively locking manner. Said devices for blocking the transmission which are used as parking locks are engaged when the selector lever of the automatic transmission is moved into the position P. This is the precondition that, for example, the vehicle key in the ignition lock is released for extraction when the engine is at a standstill. As a rule, said devices for blocking the transmission are actuated hydraulically by way of the compressed oil supply means which is present in the transmission. In the case of electric vehicle drives, said hydraulic compressed oil supply means is usually not available. Electromechanical actuating means for the devices for blocking the transmission which do not require the hydraulic pressure supply are therefore being developed.

DE 10 2014 211 390 proposes a parking lock arrangement which is distinguished by an electric motor and a solenoid as a redundant actuating means. In this case, both the actuating mechanism and the drive are arranged within the transmission space which is filled at least partially with oil. The components of the parking lock arrangement are of oil-resistant and temperature-resistant configuration, and the electric connectors are routed in a sealed manner out of the transmission space which is filled at least partially with oil. The technical complexity of configuring the components to be oil-resistant and temperature-resistant and of routing the electric connectors in a sealed manner out of the transmission is very high and correspondingly expensive. The robustness of the components is likewise impaired.

The state of the blocking means cannot be detected unambiguously by way of the embodiment of the device for blocking the transmission without a position sensor. The electronically commutated motors which are proposed as an alternative are firstly very complicated, and secondly they do not make an absolute position detection of the parking lock possible, however.

Electrically actuated devices for blocking the transmission which are supplied exclusively from the on-board vehicle electrical system do not function in the case of a failure of the on-board vehicle electrical system. Without a redundant energy supply, there is no longer the parking brake function of the device for blocking the transmission in the case of a failure of the on-board electrical system.

The devices for blocking the transmission which are usually arranged in the transmission space which is filled at least partially with oil as a rule require installation space in the region of the parking lock gear, which installation space is as a rule not available there.

There is therefore the requirement for a robust, functionally reliable actuation means for the device for blocking the transmission, which actuating means is favorable in terms of installation space and cost.

SUMMARY OF THE INVENTION

The apparatus according to the invention has the advantage that a device for blocking the transmission is actuated by an electromechanical drive which is arranged outside the transmission space which is filled at least partially with oil. Said drive has the advantage that it has to be of neither oil-resistant nor temperature-resistant design, and the electric connectors do not have to be routed through the transmission wall. Furthermore, it is advantageous that the electromechanical drive does not require a compressed oil supply for the hydraulic actuation.

According to the invention, an electromechanical device for blocking the transmission is provided to this end, consisting of an actuating mechanism and a drive. The actuating mechanism is arranged within the transmission in a transmission space which is filled at least partially with oil, and the drive is advantageously arranged outside the transmission space which is filled at least partially with oil.

An electric motor is advantageously used for the drive of the electromechanically actuated device for blocking the transmission. Electric motors are firstly very robust, and secondly very inexpensive in the case of simple designs. It is advantageous that the electric motor does not require a compressed oil supply or actuating valves.

As a result of the arrangement of the electric motor outside the transmission space which is filled at least partially with oil, it is particularly advantageous that exclusively the drive shaft of the electric motor has to be routed through the transmission wall and sealed. Even the use of inexpensive commercially available shaft seals advantageously results in a robust seal of the drive shaft of the electric motor. It is likewise advantageous that the electric connector lines do not have to be sealed and routed through the transmission wall into the transmission space which is filled partially with oil.

The actuating electronics of the electric motor are preferably attached directly to the electric motor of the drive of the electromechanically actuated device for blocking the transmission, which electric motor is arranged outside the transmission space which is filled at least partially with oil. Therefore, the actuating electronics of the electric motor do not have to be of either oil-resistant or temperature-resistant design. The configuration of the electric connectors between the actuating electronics and the electric motor likewise becomes very simple and inexpensive, since neither long cables nor plug-in connectors are required.

It is particularly advantageous if a position encoder of the electromechanically actuated device for blocking the transmission is arranged within the transmission space which is filled at least partially with oil. This results in an absolute position detection of the device for blocking the transmission in an inexpensive, functionally reliable and robust way. It is likewise advantageous that an opening of the transmission wall of the transmission space which is filled partially with oil is not required in order to route through the position encoder.

The position encoder is preferably a magnet. The position of the magnetic position encoder can be determined through the transmission wall of the transmission space which is filled partially with oil by way of a corresponding sensor (for example, Hall sensor) in an inexpensive, functionally reliable and robust way.

In an advantageous way, the position sensor is a sensor which determines the position of the magnetic position encoder through the transmission wall of the transmission space which is filled partially with oil. It is advantageous that the sensor does not have to be designed for the ambient conditions within the transmission space which is filled partially with oil, and therefore is inexpensive, functionally reliable and robust.

The sensor or position pickup of the position sensor system is preferably arranged within the actuating electronics of the electric motor outside the housing wall of the transmission space which is filled at least partially with oil. The integration of the position pickup into the actuating electronics has the advantage that electric connectors and cables are dispensed with.

The drive of the device for blocking the transmission, consisting of the electric motor, the actuating electronics and the position sensor system, preferably forms an assembly which can be preassembled. In the manufacture of transmissions, said assembly affords the advantage of simple and rapid assembly and, in the case of a failure of the drive in the vehicle, the advantage of rapid and simple exchangeability of the drive of the electromechanically actuated device for blocking the transmission. Furthermore, the assembly can be used in an advantageous way for different transmissions in an unchanged manner as a standard assembly, whereby the manufacturing quantity increases and cost effects of series manufacture can be utilized.

The supplementation of the electromechanically actuated device for blocking the transmission with an additional emergency drive is particularly advantageous, which additional emergency drive advantageously makes the complete engagement of the device for blocking the transmission possible and therefore ensures a safe state of the vehicle in the case of a failure of the electric motor or the electric power supply of the drive.

The arrangement of the emergency drive for the device for blocking the transmission within the transmission space which is filled at least partially with oil is favorable. This has the advantage that inexpensive mass-produced components can be used which are known from the control of automatic transmissions. Moreover, the arrangement of the emergency drive within the transmission space which is filled at least partially with oil affords the advantage that the device for blocking the transmission serves as an anti-theft protection means which is secure against manipulation.

The supplementation of the emergency drive of the electromechanically actuated device for blocking the transmission with a dedicated energy reserve is particularly advantageous. In an advantageous way, said energy reserve ensures the complete engagement of the device for blocking the transmission by way of the emergency drive even in the case of a failure of the electric power supply, and therefore ensures a safe state of the vehicle.

The emergency drive can preferably engage the device for blocking the transmission from every position of the electromechanically actuated device for blocking the transmission. This advantageously avoids a situation where, in the case of a partial or complete failure of the drive of the device for blocking the transmission, the vehicle performs an undesired movement up to the action of the device for blocking the transmission, which device is actuated by way of the emergency drive, and therefore no vehicle movement which is unusual and unexpected for the vehicle user takes place. It is advantageous, in particular, that the emergency drive ensures the complete engagement in a functionally reliable and robust way even in the case of an engagement operation which has already taken place partially.

Together with the position encoder and the emergency drive, the actuating mechanism preferably forms an assembly which can be preassembled. In the manufacture of transmissions, said assembly affords the advantage of simple and rapid assembling. Furthermore, the assembly can be used in an advantageous way for different transmissions in an unchanged manner as a standard assembly, whereby the manufacturing quantity increases and cost effects of series manufacture can be utilized.

Further features and advantages of the present invention will become clear to a person skilled in the art from the following description of exemplary embodiments which are not to be interpreted, however, as restricting the invention, with reference to the appended drawings.

All of the figures are merely diagrammatic illustrations of the method according to the invention or its constituent parts in accordance with exemplary embodiments of the invention. In particular, spacings and size relations are not illustrated to scale in the figures. Corresponding elements are provided with the same reference numerals in the different figures.

DETAILED DESCRIPTION

Figure 1:
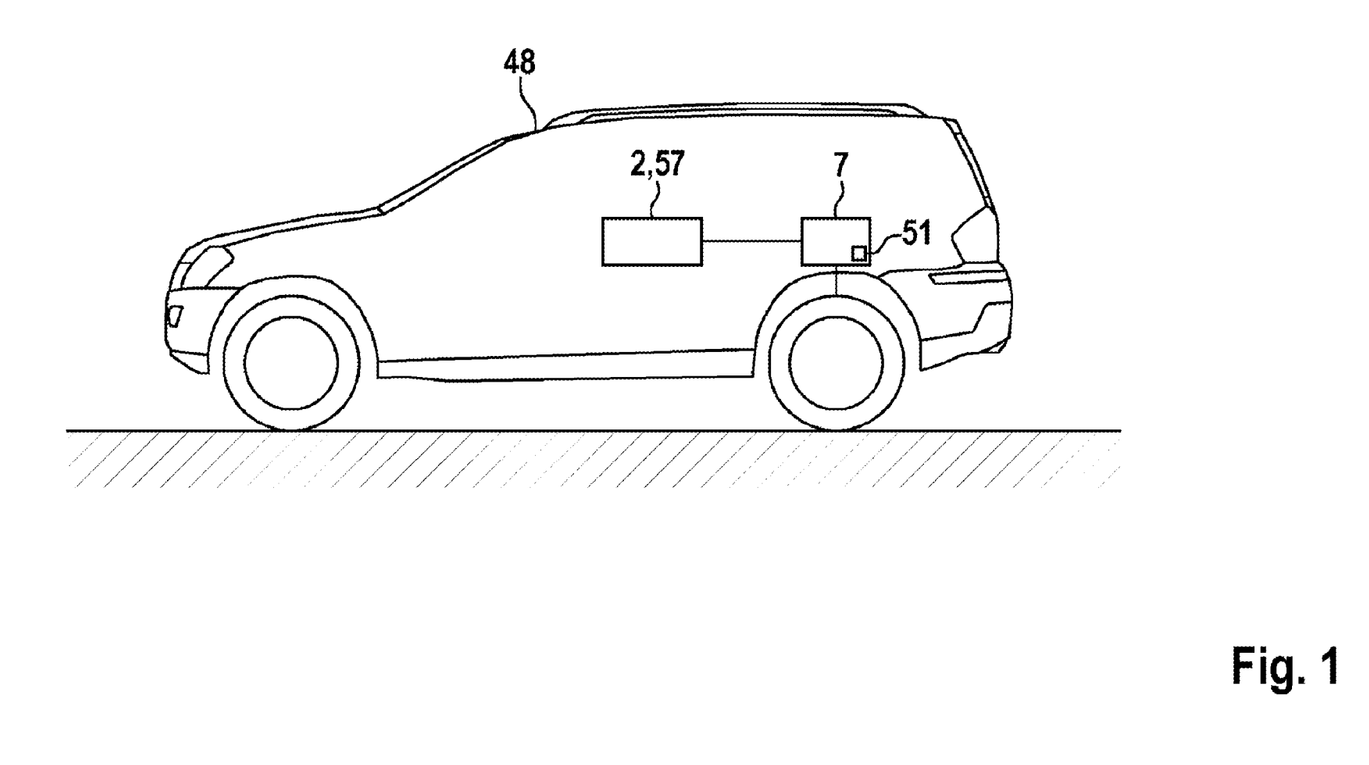
FIG. 1 shows a diagrammatic illustration of a vehicle having a drive unit which consists of a motor/engine and a transmission.

FIG. 1 shows a diagrammatic illustration of a vehicle 48 having a drive unit 1 which consists of an electric motor 2 or an internal combustion engine 57 and a transmission 7. Here, the vehicle 48 is shown diagrammatically as a multiple-track vehicle, but can also be a single-track vehicle such as, for example, an electrically driven motorcycle or a bicycle with an electric auxiliary drive. The electric motor 2 or the internal combustion engine 57 drives the drive wheel or the drive wheels of the vehicle 48 via the transmission 7. In the case of the use of an internal combustion engine 57, a transmission 7 with a plurality of shiftable stages is usually used, which stages can either be shifted manually by way of the driver or can be shifted automatically by way of a controller, that is to say without intervention of the driver. In the case of vehicles 48 which are equipped with an electric drive motor 2, the equipping of the transmission 7 with shiftable stages can largely be dispensed with, with the result that, in the case of electric motors 2, transmissions 7 without shiftable stages or with only a very small number of shiftable stages are as a rule used. In the case of multiple-track vehicles, the transmissions 7 are usually equipped with a differential gear, in order to compensate for the different paths of the inner and outer drive wheels which occur when driving around bends.

When the vehicle is parked, the drive train is used, in addition to the usually present parking brake, in order to prevent unintentional rolling away of the vehicle. To this end, in the simplest case of a vehicle 48 with an internal combustion engine 57 and a transmission 7 which can be shifted manually, a low gear stage of the transmission 7 is engaged in the case of parking of the vehicle. A torque which acts on the drive wheels is then converted by way of the transmission 7 into a small torque which cannot overcome the compression of the internal combustion engine 57. In the case of equipping of the vehicle 48 with an internal combustion engine 57 and an automatically shifting transmission 7, this simple parking locking means of the vehicle 48 is not possible on account of the absence of a direct through-connected drive of the hydrodynamic torque converter of the transmission 7. In cases of this type, the transmission is equipped with an additional device for blocking the transmission, what is known as a parking lock 51 which prevents unintentional rolling away of the parked vehicle 48 as a result of free rotation of the drive wheel or the drive wheels. In the case of a vehicle 48 with an electric motor 2, unintentional rolling away of the parked vehicle 48 as a result of free rotation of the wheels has to be prevented in every case by way of an additional parking lock 51, although the electric motor 2 is permanently connected mechanically to the drive wheel or the drive wheels on account of the absence of a separating clutch or the absence of a torque converter. An electric motor 2 does not have the brake torque which is present in the case of a parked internal combustion engine 57, with the result that a sufficient braking torque does not prevail on the drive wheel or the drive wheels despite the direct coupling of the electric motor 2 via the transmission 7.

Figure 2:
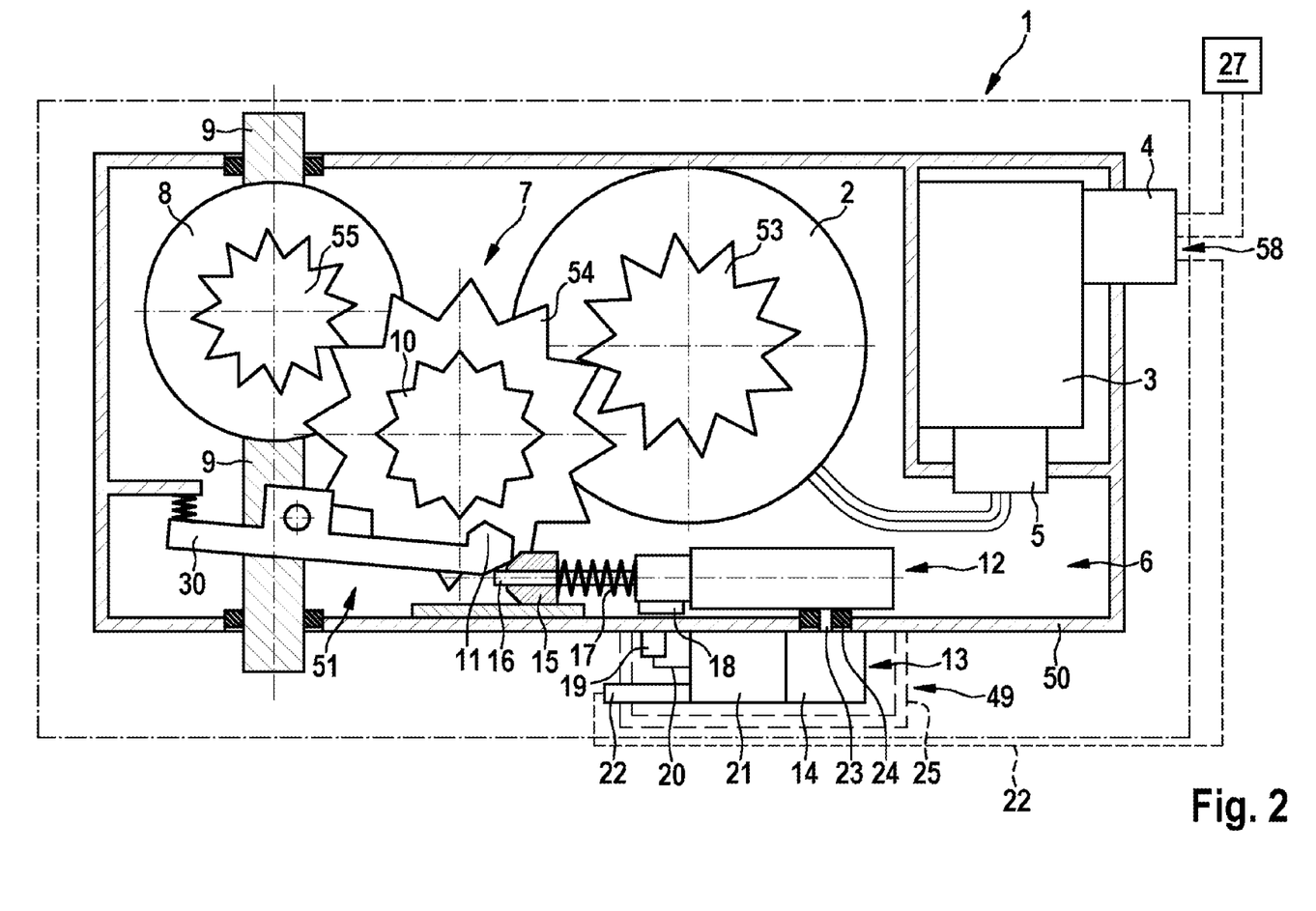
FIG. 2 shows a diagrammatic illustration of a vehicle drive for a multiple-track vehicle having a transmission and a device for blocking the transmission.

FIG. 2 shows a diagrammatic illustration of a vehicle drive 1 for a multiple-track vehicle having a transmission 7, a motor/engine 2, power electronics 3 with a plug 4 to the vehicle wiring harness 58 and to the vehicle battery 27, an oil-tight plug 5 into the transmission space 6 which is filled partially with oil, and a parking lock 51. An electric motor 2 is shown here by way of example, which electric motor 2 drives a gearwheel 54 via a pinion 53 which is seated on its shaft. For its part, said gearwheel 54 drives the differential gear 8 via the output pinion 55, which differential gear 8 then transmits the drive torque to the axle shafts 9.

The parking lock 51 consists of a locking pawl 30 which locks or releases a parking lock gear 10 which is connected fixedly to a gearwheel 54 so as to rotate with it. FIG. 2 shows the non-engaged state of the parking lock 51.

The actuating mechanism 12 of the electromechanically actuated parking lock 51 lies in the transmission space 6 which is filled at least partially with oil. The drive assembly 13 is arranged outside the transmission space 6 which is filled at least partially with oil, and can be protected against spray water, stone chipping and the like by a housing part 25 which is not filled with oil. The drive 49 of the electromechanically actuated parking lock 51 is an electric motor 14, the drive shaft 23 of which is routed through the wall 50 of the transmission space 6 which is filled at least partially with oil, and is sealed by way of a seal 24. A position encoder 18 which is configured, for example, as a magnet is connected fixedly to the actuating means of the parking lock 51. The position of said position encoder 18 is detected through the housing wall 50 by way of a position sensor 19 which is configured, for example, as a Hall effect sensor. The position sensor 19 is connected via the cable 20 to the actuating electronics 21 of the drive 49 of the parking lock 51. Satisfactory lubrication of the moving parts of the actuating mechanism 12 is ensured by way of the arrangement of the actuating mechanism 12 in the transmission space 6 which is filled at least partially with oil. The actuating rod 16 of the actuating mechanism 12 carries a locking element 15 which is configured as a cone. By way of displacement of the actuating rod 16 with the locking element 15, the locking element 11 is engaged into or released from the toothing system of the parking lock gear 10. The drive 49 of the parking lock 51 is actuated by way of the actuating electronics 21 which are connected by way of the cable with a plug 22 to the power electronics 3 and via the cable 20 to the position sensor 19. A compression spring 17 is arranged between the locking element 15 and the actuating mechanism 12. If the locking element 11 cannot be engaged into the toothing system of the parking lock gear 10 on account of a tooth-on-tooth position, the locking element 15 is pushed back on the actuating rod 16 in the case of actuation of the drive 49 for engaging the parking lock 51, and the compression spring 17 is tensioned. Even a small rotational movement of the gearwheels of the transmission 7, for example as a result of the vehicle beginning to roll away, leads to there no longer being the tooth-on-tooth position and the locking element 15 inserting the locking element 11 with the aid of the spring stress of the compression spring 17 into the toothing system of the parking lock gear 10 without further actuation of the drive 49 of the parking lock 51.

Figure 3:
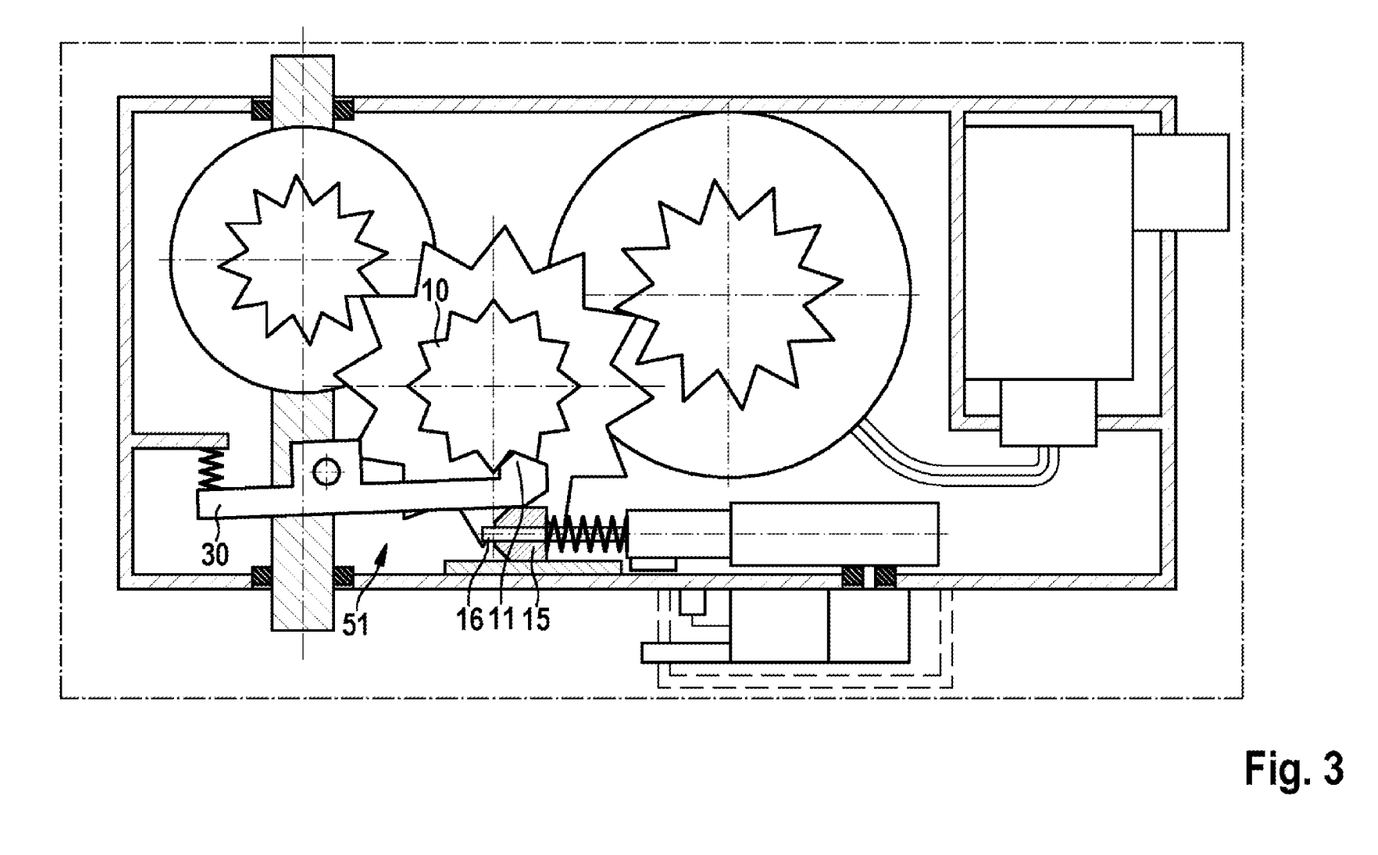
FIG. 3 shows a diagrammatic illustration of a vehicle drive for a multiple-track vehicle with an engaged state of the device for blocking the transmission.

FIG. 3 shows a diagrammatic illustration of a vehicle drive 1 for a multiple-track vehicle with an engaged state of the parking lock 51. The locking element 11 engages into the toothing system of the parking lock gear 10. The actuating rod 16 is situated in the extended state, with the result that the locking element 15 presses the locking pawl 30 with the locking element 11 into the toothing system of the parking lock gear 10 and holds it there.

Figure 4:
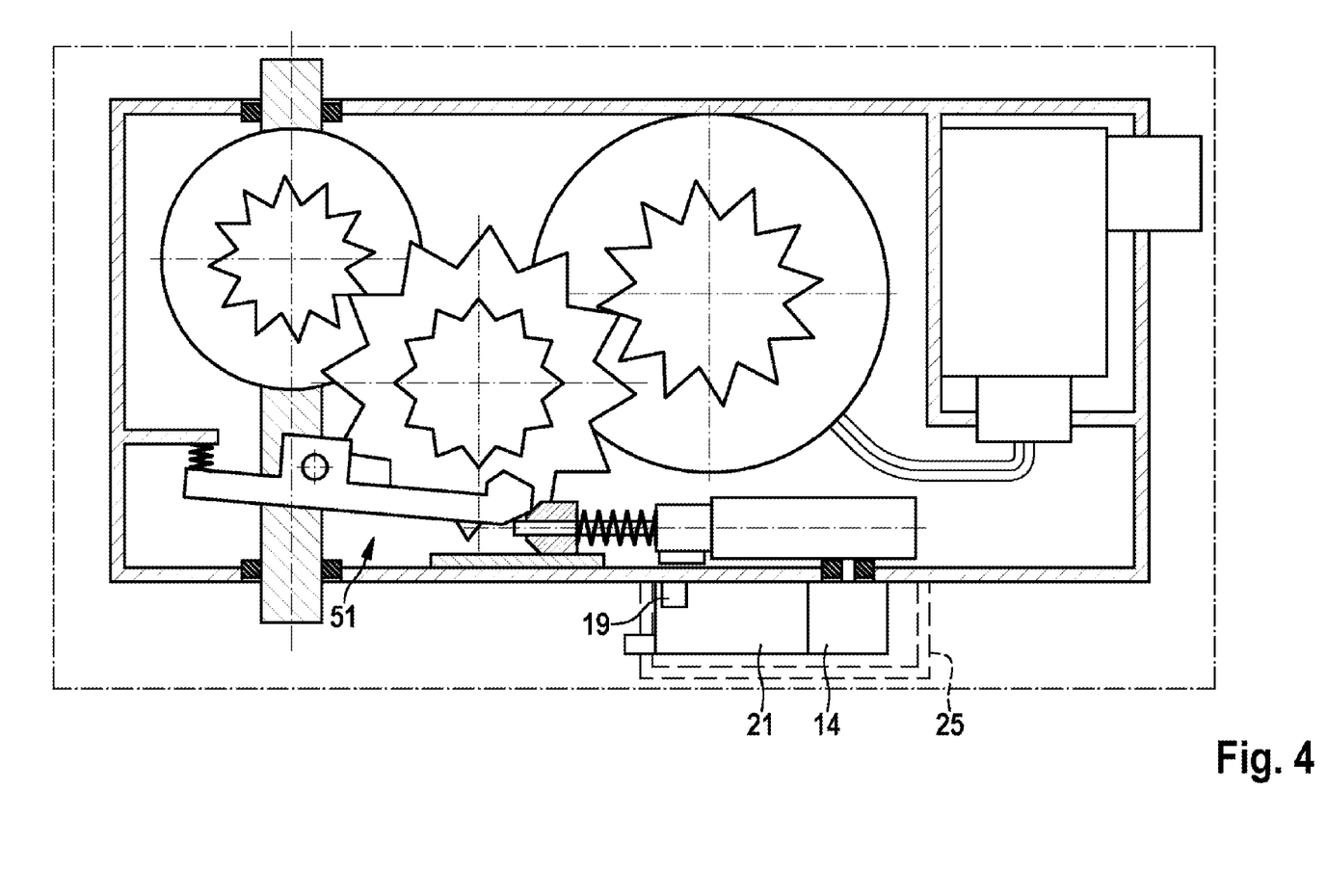
FIG. 4 shows a diagrammatic illustration of a vehicle drive for a multiple-track vehicle with a non-engaged state of the device for blocking the transmission.

FIG. 4 shows a diagrammatic illustration of a vehicle drive 1 for a multiple-track vehicle with a non-engaged state of the parking lock 51. The position sensor 19 is integrated into the actuating electronics 21 of the parking lock, which actuating electronics 21 can be protected, together with the electric motor 14, against spray water, stone chipping and the like by a housing part 25 which is not filled with oil.

Figure 5:
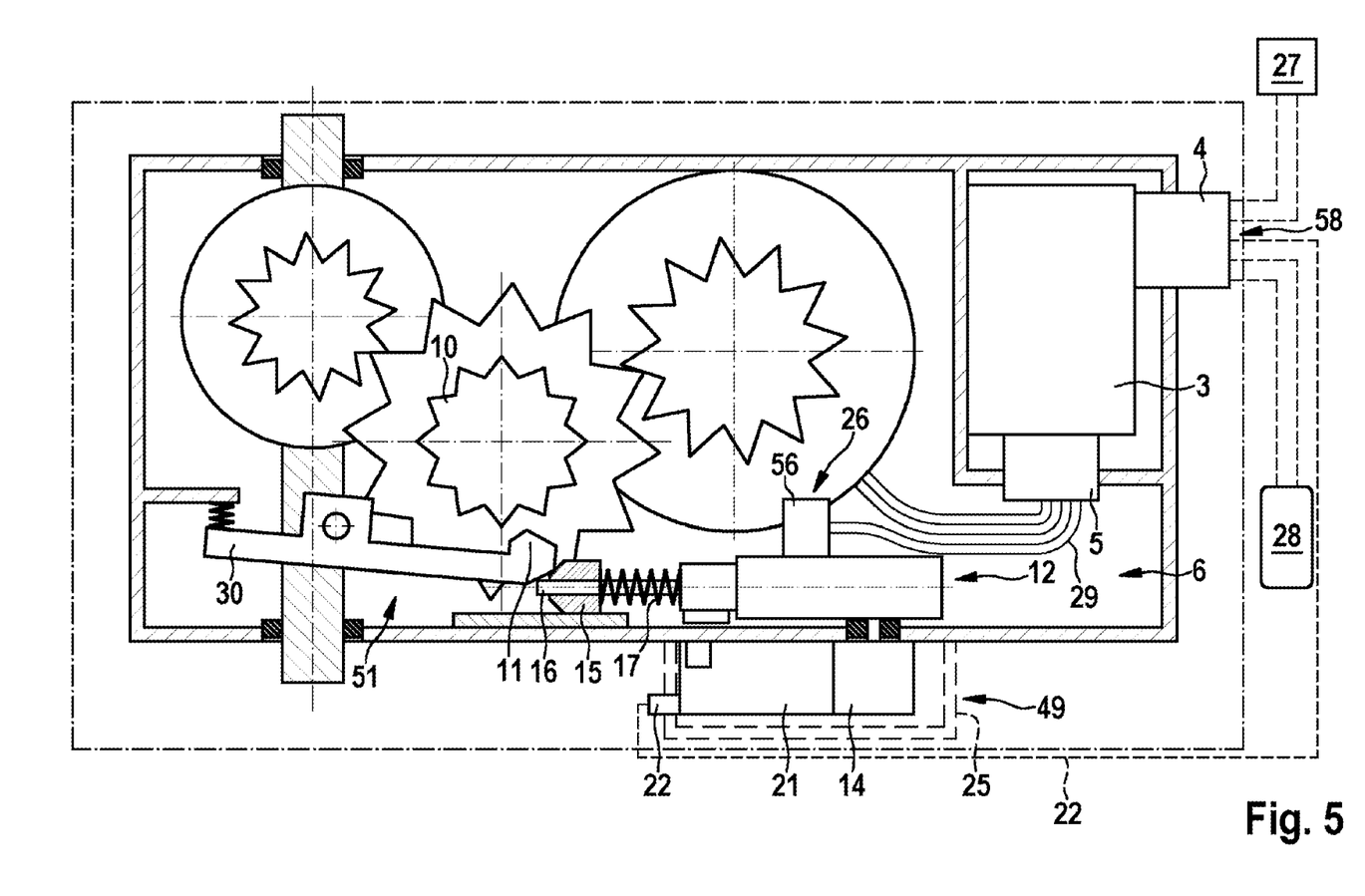
FIG. 5 shows a diagrammatic illustration of a vehicle drive for a multiple-track vehicle having an additional emergency drive of the device for blocking the transmission.

FIG. 5 shows a diagrammatic illustration of a vehicle drive 1 for a multiple-track vehicle having an additional emergency drive 26 of the electromechanically actuated parking lock 51. In addition to the outer drive 49 with the electric motor 14 and the actuating electronics 21 which are connected via the cable with a plug 22 to the power electronics 3, an emergency drive 26 is provided within the transmission space 6 which is filled at least partially with oil. Said emergency drive 26 has a dedicated energy reserve 28, in order that reliable engagement of the parking lock 51 is ensured at least once even in the case of a failure of the drive 49 and/or the energy supply 27. The emergency drive 26 consists of an electromagnet 56 which is connected to the actuating mechanism 12. The actuation of the electromagnet 56 of the emergency drive 26 takes place by way of the power electronics 3. The emergency drive 26 is connected to the power electronics 3 by way of the cable 29 and the plug 5 in the transmission space 6 which is filled partially with oil. The energy reserve 28 of the emergency drive 26 can be ensured, for example, by way of supercapacitors. In order to check the function of the emergency drive 26 regularly, the power electronics 3 can actuate the electromagnet 56 at freely selectable intervals in the case of the engagement of the parking lock. In this way, reliable operation is ensured in an emergency case, and a disruption, for example by way of an emergency drive 26 which has become immovable as a result of corrosion, is avoided and/or detected.

Figure 6:
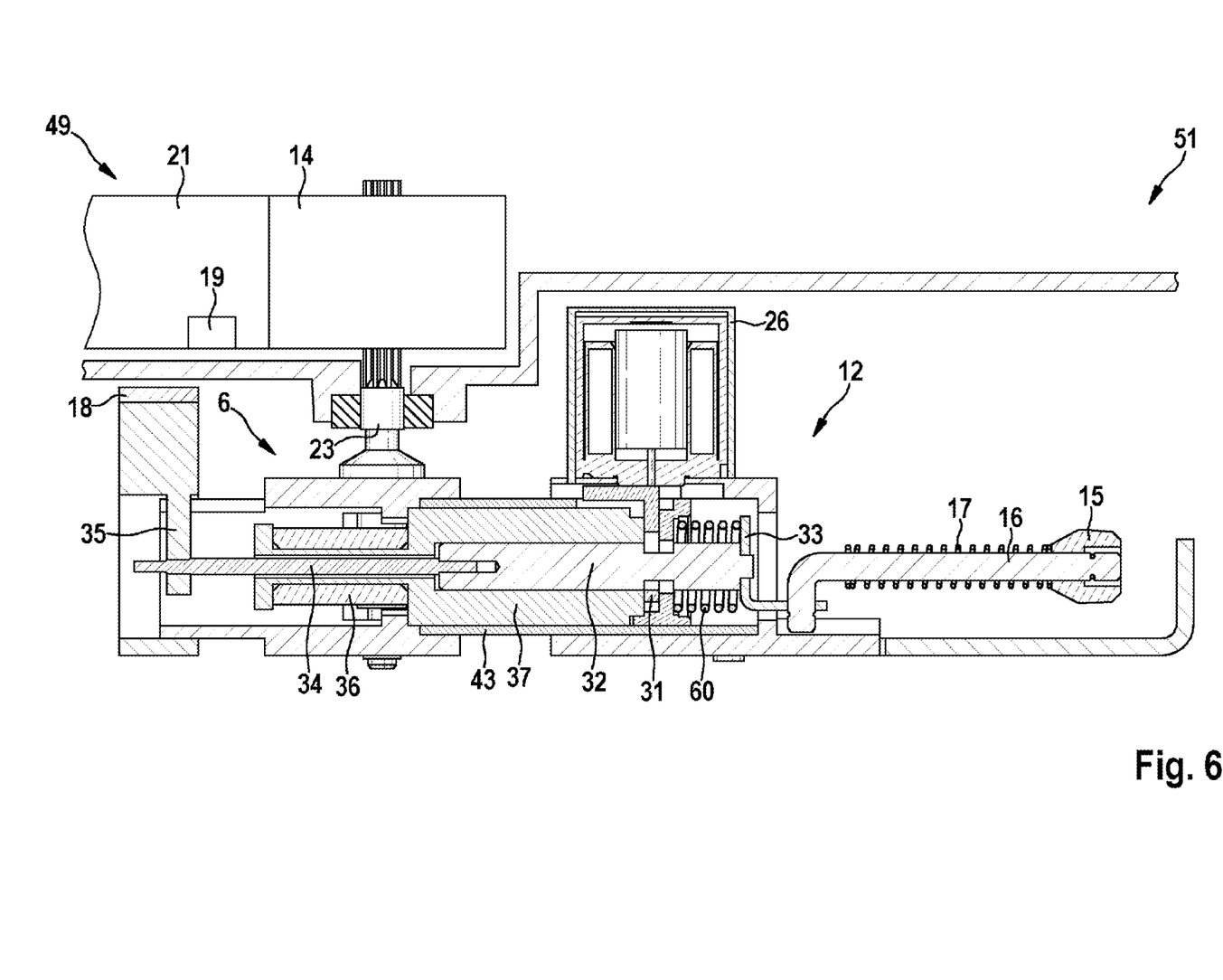
FIG. 6 shows a diagrammatic illustration of the device for blocking the transmission in the non-engaged state.

FIG. 6 shows a diagrammatic illustration of the parking lock 51 in a non-engaged state with the actuating mechanism 12, the outer drive 49 of the device for blocking the transmission 7, and the emergency drive 26. The outer drive 49 of the parking lock 51 consists of the actuating electronics 21 with the integrated position sensor 19 and the electric motor 14 which drives the actuating mechanism 12 of the parking lock 51 via the drive shaft 23. Said actuating mechanism 12 is arranged within the transmission space 6 which is filled at least partially with oil, and actuates the locking element 15 via the actuating rod 16. The drive shaft 23 engages into the toothing system of the toothing part 36, and moves the outer piston 37 in the axial direction along the cylinder axis of the outer piston 37. The inner piston 32 is arranged within the outer piston 37, which inner piston 32 is connected to the rod 34 and the angled part 33 which acts as a connection. The encoder guide 35, on which the position encoder 18 is arranged, is arranged on the rod 34. In this way, the position encoder 18 is always moved together with the inner piston 32, both in the case of actuation by way of the drive 49 and in the case of actuation by way of the emergency drive 26. This results in a detection of the position of the parking lock 51, which detection is independent of the drive of the parking lock 51. The spring 60 is situated on the inner piston 32, which spring 60 assists the emergency drive 26, is released in the case of actuation of the electromagnet 56 of the emergency drive 26, and, as a result, extends the actuating rod 16 with the locking element 15 in such a way that the locking element 15 presses the locking pawl 30 with the locking element 11 into the toothing system of the parking lock gear 10 and holds it there. During normal operation, the spring 60 is tensioned again by way of the drive 49 in the case of each release of the parking lock 51 after an actuation of the emergency drive 26. In this way, it is possible to transfer the parking lock 51 into the normal operation again by way of the release with the aid of the drive 49 after an actuation of the emergency drive 26.

The emergency drive 26 which is configured as a solenoid actuates the locking bar 31 via the locking bar arm 41 which, upon actuation, releases the inner piston 32, and the latter is displaced by way of the tensioned spring 60 and actuates the locking element 11 via the actuating rod 16 and the locking element 15. The outer piston is arranged in a tubular housing part 43. No relative movement between the outer piston 37 and the inner piston 32 takes place in the locked state of the locking bar 31. The emergency drive 26 is arranged on the housing part 40 and is not displaced together with the outer piston 37 and the inner piston 32. In this way, the emergency drive 26 can be configured without moving electric connectors.

Figure 7:
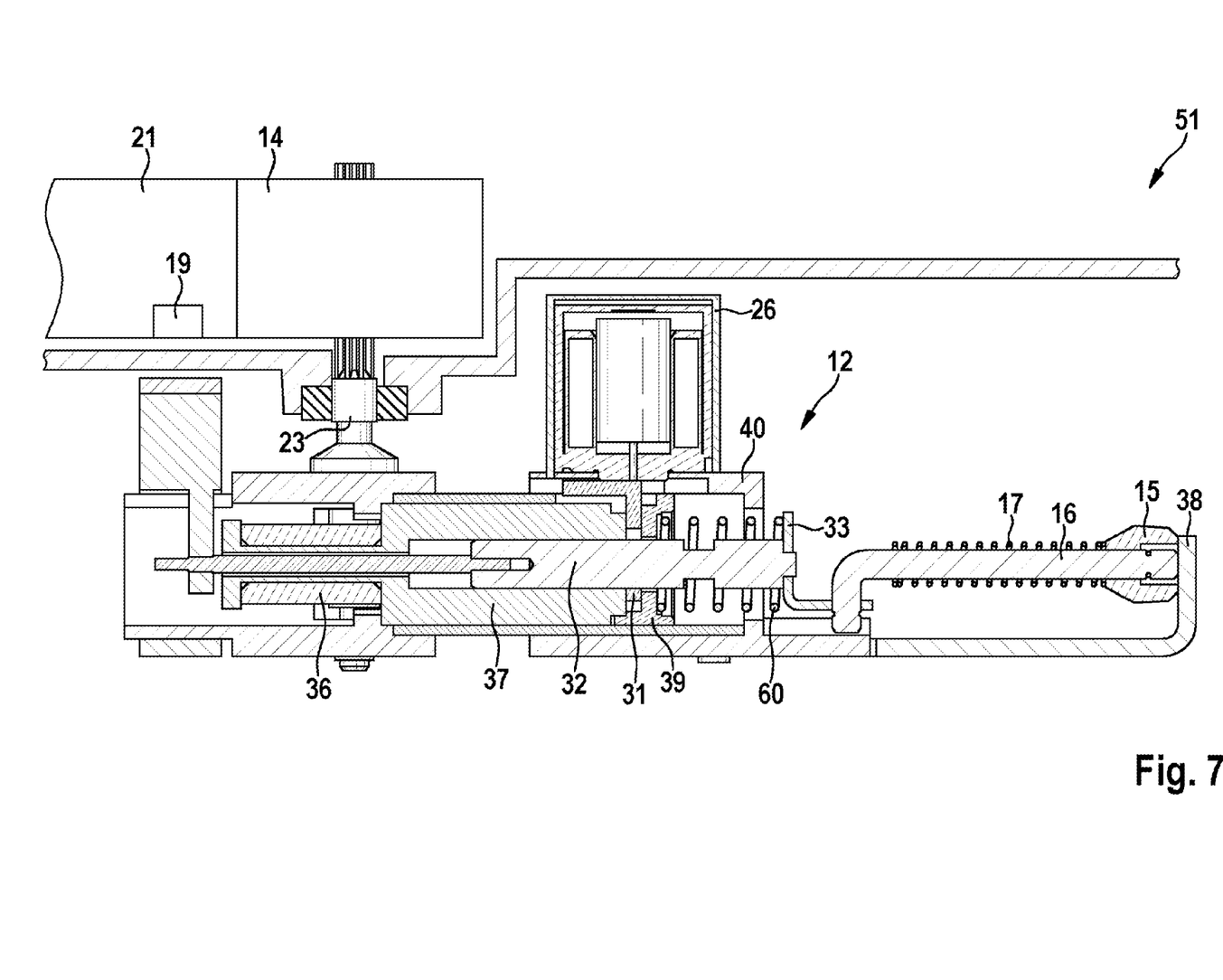
FIG. 7 shows a diagrammatic illustration of the device for blocking the transmission in the engaged state.

FIG. 7 shows a diagrammatic illustration of the parking lock 51 in the engaged state after an actuation by way of the emergency drive 26. The inner piston 32 is displaced axially by way of the stress of the spring 60 together with the actuating rod 16 which is connected via the angled part 33 which acts as a connection, with the locking element 15 and the rod 34, as far as the stop of the counterbearing 38. The locking bar 31 is actuated by way of the emergency drive 26.

Figure 8:
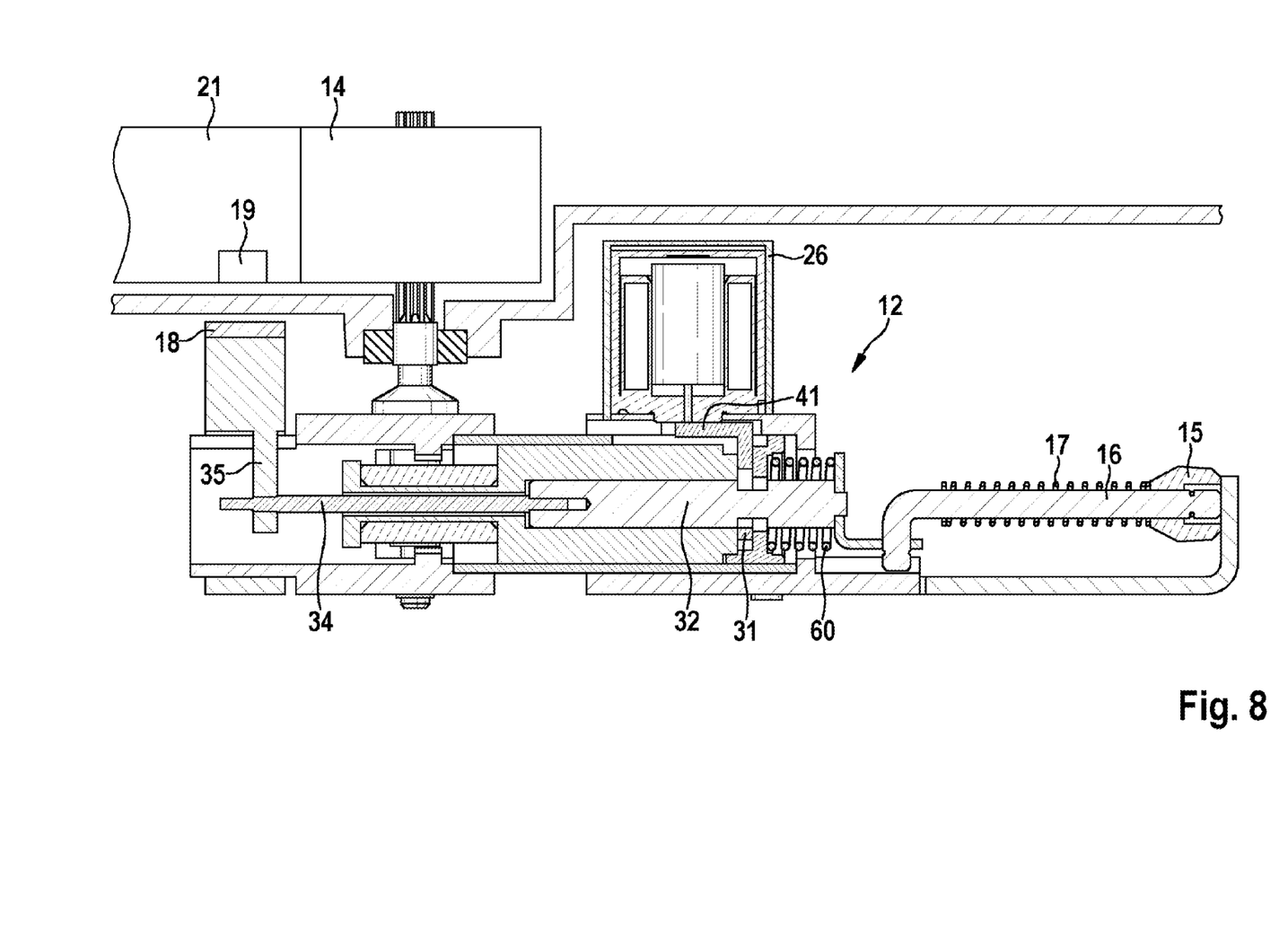
FIG. 8 shows a diagrammatic illustration of the device for blocking the transmission.

FIG. 8 shows a diagrammatic illustration of the parking lock 51. In order to release the parking lock 51 again after an actuation by way of the emergency drive 26, the drive 49 of the device for blocking the transmission 7 is first of all likewise actuated by way of the actuating means 21 and the electric motor 14, the drive shaft 23 and the toothing part 36, as in the case of the engagement of the parking lock 51 in a normal actuation. The spring 60 is tensioned again by way of the axial movement of the outer piston 37, since the actuating rod 16 bears by way of the stop against the counterbearing 38. In the case of a completely tensioned spring 60, the locking bar 31 which is held via the locking bar arm 41 reaches its locking position in the locking bar holder 39 and latches into it. When the mechanical stop on the housing part 40 of the locking bar holder 39 which is seated on the outer piston 37 is reached, the further movement of the electric motor 14 is blocked. The current increase of the electric motor 14, which current increase results from the blocking action, is detected by the actuating electronics 21 which switch over the rotational direction of the electric motor 14 after the detection of the blocking action. In this way, the electric motor 14 moves the actuating mechanism 12 with the housing part 40 via the drive shaft 23 and the toothing part 36 into the non-engaged state of the parking lock 51. The spring 60 remains tensioned here. In this way, the starting state is reached, as shown in FIG. 6. As a result of the design of the actuating mechanism 12 with the emergency drive 26 and the locking bar arm 41 which can be displaced to this end over the complete stroke of the actuating mechanism 12, the emergency drive 26 can be actuated from every position of the parking lock 51, and can ensure the engagement of the parking lock 51 without limitations, even in the case of an engagement movement which has already taken place partially. In this way, the system of the parking lock is always redundant.

Figure 9:
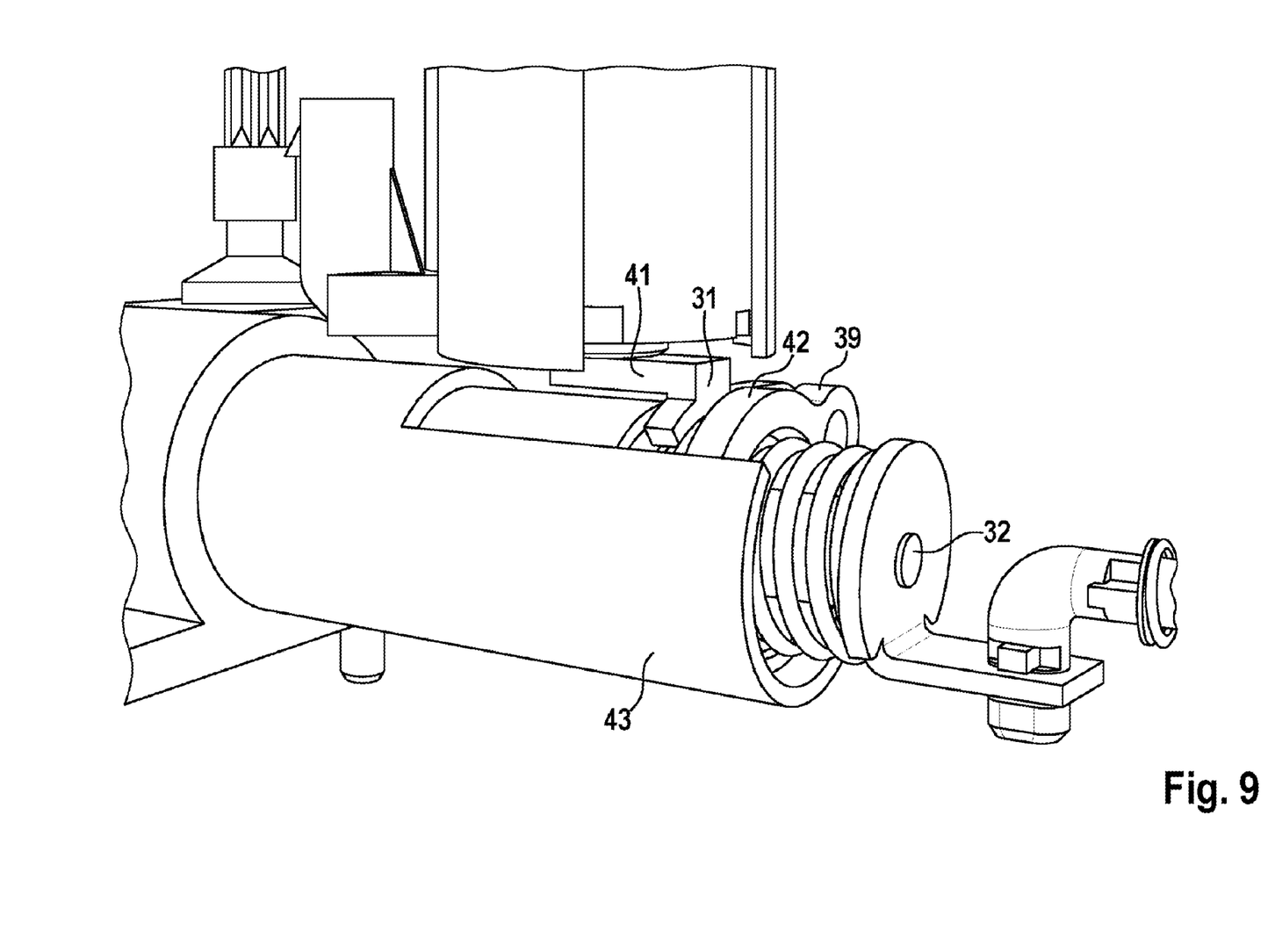
FIG. 9 shows a diagrammatic perspective view of the device for blocking the transmission.

FIG. 9 shows a diagrammatic three-dimensional view of the parking lock 51 having the components of locking bar 31, inner piston 32, locking bar holder 39, locking bar arm 41, locking bar holder lug 42 and the tubular housing part 43.

Figure 10A:
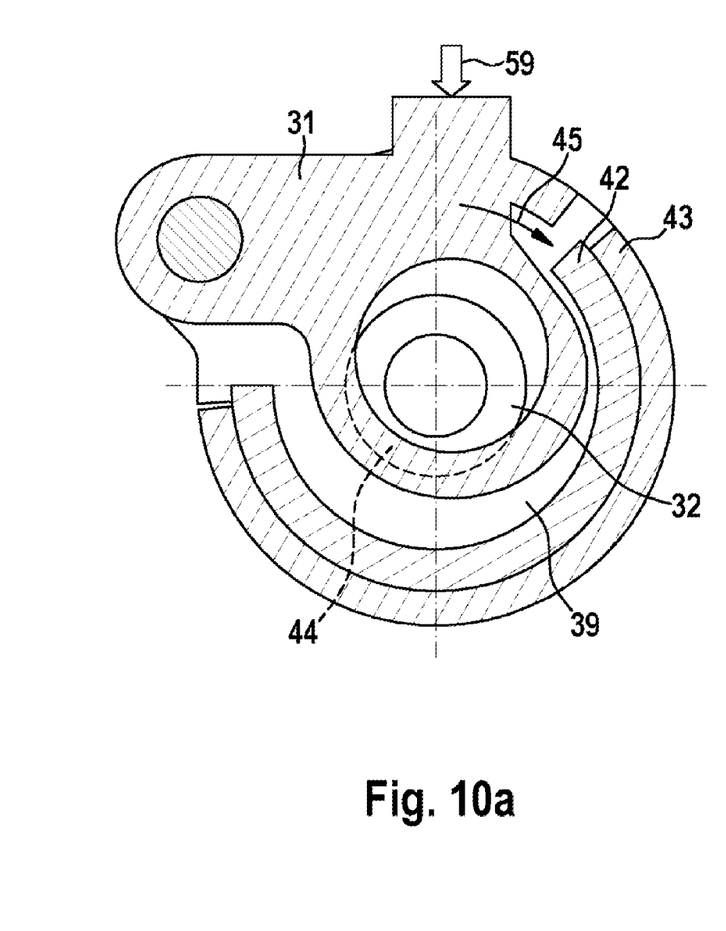
FIG. 10a shows a diagrammatic illustration of a section through the device for blocking the transmission.

FIG. 10*a* shows a diagrammatic illustration of a section through the parking lock 51 (shown in FIG. 9) with the tubular housing part 43. The locking bar 31 is in engagement and locks the inner piston 32. The locking function results from the overlap 44. The locking bar 31 is held in the axial direction by way of the locking bar holder 39. In the case of actuation of the emergency drive 26, an actuating force 59 is exerted in the arrow direction on the locking bar 31, as a result of which a movement in the direction 45 is triggered. Said movement is limited by way of the locking bar holder lug 42. In this way, the overlap 44 is canceled, and the inner piston 32 can move freely in the axial direction.

Figure 10B:
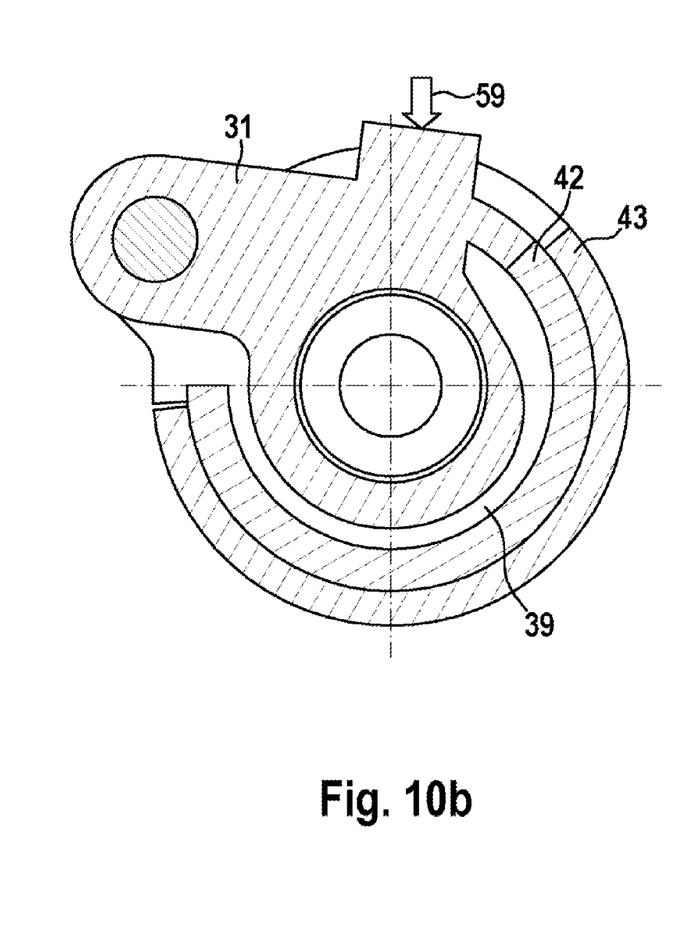
FIG. 10b shows a diagrammatic illustration of a section through the device for blocking the transmission in the case of an actuated emergency drive.

FIG. 10b shows a diagrammatic illustration of a section through the parking lock 51 (shown in FIG. 9) with the tubular housing part 43. The locking bar 31 is no longer in engagement, and the inner piston 32 can move freely in the axial direction. This illustration corresponds to the state of the parking lock 51 after actuation of the emergency drive 26.

Figure 11:
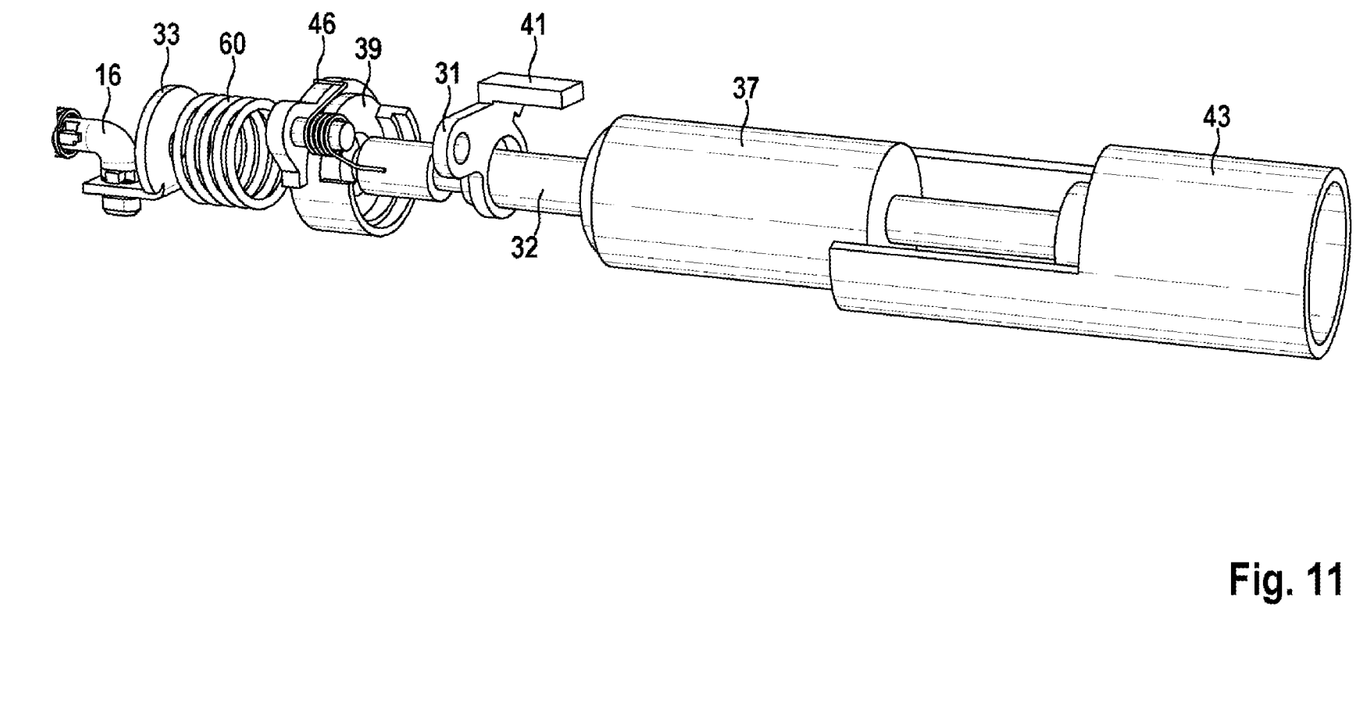
FIG. 11 shows a diagrammatic illustration of the construction of the device for blocking the transmission.

FIG. 11 shows a diagrammatic illustration of the construction of the parking lock 51 (shown by way of example in FIG. 6) with the components of actuating rod 16, the angled part 33 which serves as a connection, spring 60, locking bar holder 39, leg spring 46, locking bar 31, locking bar arm 41, inner piston 32 and outer piston 37.

Figure 12:
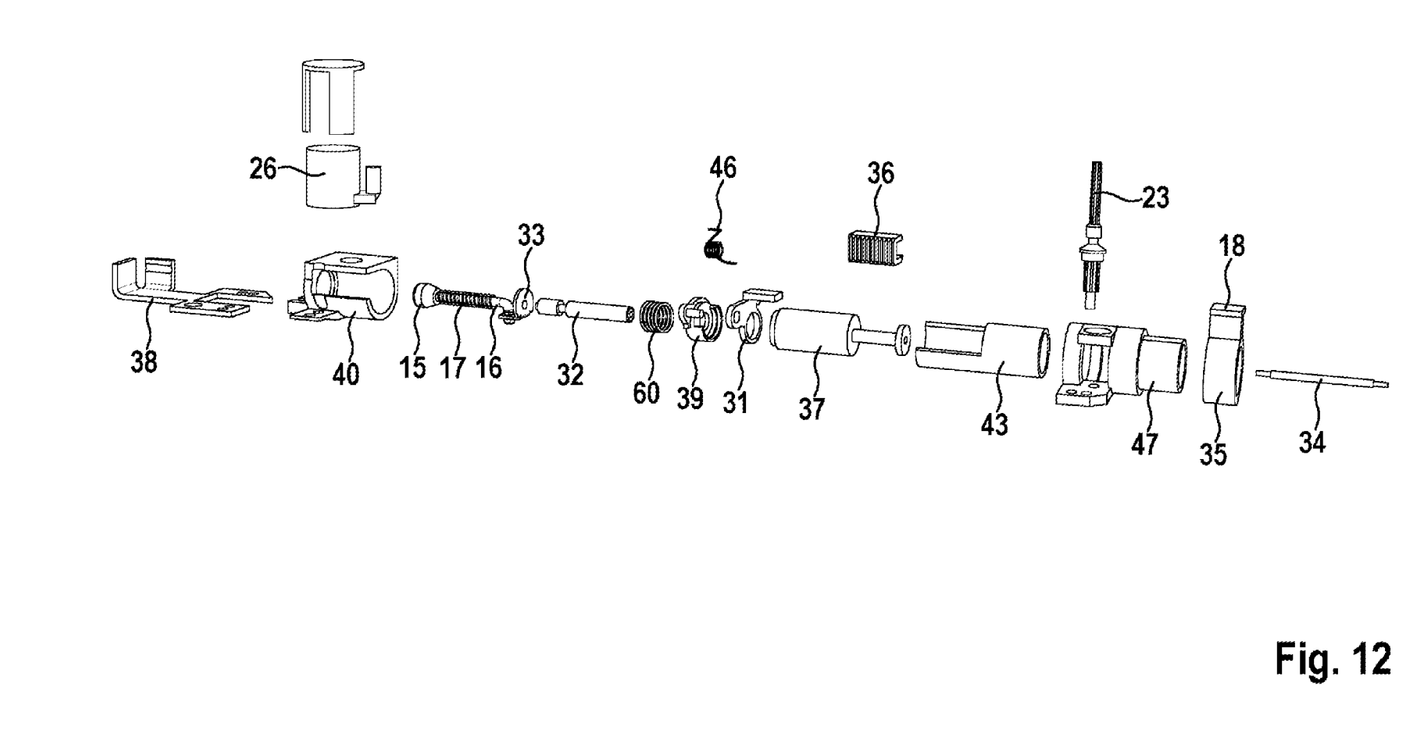
FIG. 12 shows a diagrammatic illustration of the construction of the actuating mechanism of the device for blocking the transmission.

FIG. 12 shows a diagrammatic illustration of the construction of the actuating mechanism 12 of the parking lock 51 (shown by way of example in FIG. 6) with the components of counterbearing 38, solenoid of the emergency drive 26, housing part 40, locking element 15, actuating rod 16, the angled part 33 which serves as a connection, inner piston 32, spring 60, locking bar holder 39, leg spring 46, locking bar 31, outer piston 37 with toothing part 36, tubular housing part 43, housing part 47 with the drive shaft 23, encoder guide 35 and position encoder 18, and the rod 34. Said actuating mechanism 12 can be adapted to different installation situations by way of simple shortening or lengthening, for example, of the components of actuating rod 16, inner piston 32, outer piston 37 or the rod 34.

What is claimed is:

1. A device (51) for blocking a transmission (7) comprising an actuating mechanism (12) which is arranged within the transmission (7) in a transmission space (6) which is filled at least partially with oil, and having a drive (49) of the actuating mechanism (12), characterized in that
   the drive (49) is arranged outside the transmission space (6) which is filled at least partially with oil,
   the drive (49) of the device (51) for blocking the transmission (7) is an electric motor (14), and
   one drive shaft (23) of the electric motor (14) is guided through a wall (50) of the transmission (7) into the transmission space (6) which is filled at least partially with oil,
   wherein the wall (50) at least partially defines the transmission space (6) and a seal (24) is located between the drive shaft (23) and the wall (50) to seal the transmission space (6),
   wherein the electric motor (14) has actuating electronics (21) which are installed directly on the electric motor (14) and lie outside the transmission space (6) which is filled at least partially with oil,
   wherein the transmission space (6) is defined by the wall (50), and
   wherein the electric motor (14) and the actuating electronics (21) are protected by a housing part (25) mounted on the wall (50).

2. The device (51) for blocking the transmission (7) as claimed in claim 1, characterized in that a position encoder (18) of the electromechanically actuated device (51) for blocking is arranged within the transmission space (6) which is filled at least partially with oil.

3. The device (51) for blocking the transmission (7) as claimed in claim 2, characterized in that the position encoder (18) is a magnet.

4. The device (51) for blocking the transmission (7) as claimed in claim 3, characterized in that a position sensor (19) is arranged outside the transmission space (6) which is filled at least partially with oil.

5. The device (51) for blocking the transmission (7) as claimed in claim 4, characterized in that the position sensor (19) is arranged in the actuating electronics (21).

6. The device (51) for blocking the transmission (7) as claimed in claim 2, characterized in that, together with the position encoder (18) and an emergency drive (26), the actuating mechanism (12) forms an assembly which can be preassembled.

7. The device (51) for blocking the transmission (7) as claimed in claim 1, characterized in that, together with the actuating electronics (21), the drive (49) forms an assembly (13) which can be preassembled.

8. The device (51) for blocking the transmission (7) as claimed in claim 1, further comprising an additional emergency drive (26) for the device (51) for blocking.

9. The device (51) for blocking the transmission (7) as claimed in claim 8, characterized in that the emergency drive (26) for the device (51) for blocking the transmission (7) is arranged within the transmission space (6) which is filled at least partially with oil.

10. The device (51) for blocking the transmission (7) as claimed in claim 9, characterized in that the emergency drive (26) for the device (51) for blocking the transmission (7) has a dedicated energy reserve (28).

11. The device (51) for blocking the transmission (7) as claimed in claim 10, characterized in that the emergency drive (26) for the device (51) for blocking the transmission (7) can engage said device (51) from every position of the actuating mechanism (12).

12. A device (51) for blocking a transmission (7) comprising an actuating mechanism (12) which is arranged within the transmission (7) in a transmission space (6) which is filled at least partially with oil, and having a drive (49) of the actuating mechanism (12),
   wherein the device (51) comprises an additional emergency drive (26) for blocking,
   wherein the drive (49) is arranged outside the transmission space (6) which is filled at least partially with oil, and
   wherein the emergency drive (26) for the device (51) for blocking the transmission (7) is arranged within the transmission space (6) which is filled at least partially with oil.

13. The device (51) for blocking the transmission (7) as claimed in claim 12, characterized in that the emergency drive (26) for the device (51) for blocking the transmission (7) has a dedicated energy reserve (28).

14. The device (51) for blocking the transmission (7) as claimed in claim 12, characterized in that the emergency drive (26) for the device (51) for blocking the transmission (7) can engage said device (51) from every position of the actuating mechanism (12).

15. The device (51) for blocking the transmission (7) as claimed in claim 12, characterized in that the drive (49) of the device (51) for blocking the transmission (7) is an electric motor (14).

16. The device (51) for blocking the transmission (7) as claimed in claim 15, characterized in that the electric motor (14) has actuating electronics (21) which are installed directly on the electric motor (14) and lie outside the transmission space (6) which is filled at least partially with oil.

17. The device (51) for blocking the transmission (7) as claimed in claim 12, characterized in that a position encoder (18) of the electromechanically actuated device (51) for blocking is arranged within the transmission space (6) which is filled at least partially with oil.

* * * * *